United States Patent
McCarthy et al.

(10) Patent No.: US 11,611,204 B2
(45) Date of Patent: *Mar. 21, 2023

(54) FAULT PROTECTION DEVICE WITH GROUND TRIP DELAY AND METHOD

(71) Applicant: S&C Electric Company, Chicago, IL (US)

(72) Inventors: Christopher McCarthy, Glenview, IL (US); Raymond P. O'Leary, Evanston, IL (US)

(73) Assignee: S&C Electric Company, Chicago, IL (US)

( * ) Notice: Subject to any disclaimer, the term of this patent is extended or adjusted under 35 U.S.C. 154(b) by 250 days.

This patent is subject to a terminal disclaimer.

(21) Appl. No.: 17/146,575

(22) Filed: Jan. 12, 2021

(65) Prior Publication Data

US 2021/0175702 A1 Jun. 10, 2021

Related U.S. Application Data

(63) Continuation of application No. 12/141,425, filed on Jun. 18, 2008, now Pat. No. 10,910,816.

(60) Provisional application No. 60/945,240, filed on Jun. 20, 2007.

(51) Int. Cl.
| | | |
|---|---|---|
| *H02H 3/06* | (2006.01) | |
| *H02H 1/04* | (2006.01) | |
| *H02H 11/00* | (2006.01) | |
| *H02H 3/00* | (2006.01) | |

(52) U.S. Cl.
CPC ............. *H02H 3/063* (2013.01); *H02H 1/04* (2013.01); *H02H 3/006* (2013.01); *H02H 11/008* (2013.01)

(58) Field of Classification Search
CPC ........ H02H 3/063; H02H 1/04; H02H 11/008; H02H 3/006
USPC ........................................................... 361/42
See application file for complete search history.

(56) References Cited

U.S. PATENT DOCUMENTS

| | | | | |
|---|---|---|---|---|
| 5,097,380 | A | 3/1992 | Moran | |
| 5,346,596 | A * | 9/1994 | Borrione | H01H 33/002 205/770 |
| 5,650,901 | A * | 7/1997 | Yamamoto | H03K 17/725 361/13 |
| 5,666,254 | A * | 9/1997 | Thomas | H02H 9/026 361/13 |
| 5,805,393 | A | 9/1998 | Thomas | |
| 5,864,458 | A * | 1/1999 | Duffy | H02H 3/025 361/10 |
| 5,917,686 | A * | 6/1999 | Chan | H01H 83/144 361/42 |
| 6,437,955 | B1 * | 8/2002 | Duffy | H02H 9/026 361/45 |
| 6,535,366 | B1 | 3/2003 | Frohlich et al. | |
| 6,546,342 | B1 | 4/2003 | Dougherty et al. | |

(Continued)

OTHER PUBLICATIONS

International Search Report for Application No. PCT/US2008/067506 dated Oct. 12, 2008.

(Continued)

*Primary Examiner* — Dharti H Patel (57) ABSTRACT

A reclosing fault protection device detects a partial bypass state. Upon detecting the partial bypass state, the fault protection device implements a ground trip delay operating state. The ground trip delay operating state provides a delayed ground trip response characteristic.

16 Claims, 4 Drawing Sheets

(56) References Cited

U.S. PATENT DOCUMENTS

| | | | |
|---|---|---|---|
| 6,643,112 B1 | 11/2003 | Carton et al. | |
| 6,667,866 B1* | 12/2003 | LaPlace | H02H 3/063 |
| | | | 361/87 |
| 8,358,488 B2* | 1/2013 | Premerlani | H01H 59/0009 |
| | | | 361/2 |
| 10,910,816 B2* | 2/2021 | McCarthy | H02H 3/063 |
| 2002/0131222 A1 | 9/2002 | McClure et al. | |
| 2003/0056973 A1 | 3/2003 | Roberts | |
| 2003/0184931 A1* | 10/2003 | Morris | H02H 11/005 |
| | | | 361/42 |
| 2004/0252423 A1* | 12/2004 | Boren | H02H 7/0833 |
| | | | 361/23 |
| 2005/0036253 A1* | 2/2005 | Tian | H02J 9/062 |
| | | | 361/66 |
| 2005/0280972 A1 | 12/2005 | Jonsson | |
| 2007/0067132 A1 | 3/2007 | Tziouvaras et al. | |
| 2012/0286589 A1* | 11/2012 | Kostovic | H01H 33/596 |
| | | | 307/115 |

OTHER PUBLICATIONS

International Preliminary Report on Patentability for Application No. PCT/US2008/067506 dated Jan. 7, 2010.

* cited by examiner

FAULT PROTECTION DEVICE WITH GROUND TRIP DELAY AND METHOD

CROSS-REFERENCE TO RELATED APPLICATIONS

This application is continuation of prior U.S. Pat. No. 10,910,816 issued on Feb. 2, 2021, which claims priority to and benefit from U.S. Provisional Patent Application Ser. No. 60/945,240 filed Jun. 20, 2007, the disclosure of which is hereby incorporated herein by reference for all purposes.

TECHNICAL FIELD

This patent relates to fault protection devices, and in particular, this patent relates to a fault protection device that incorporates a ground trip delay feature.

BACKGROUND

Power distribution systems typically include distribution feeders (ranging from approximately 4 KV to 69 KV) originating in power distribution substations and leading to the source of supply for end customers of an electrical supply utility or agency. Regulatory service provision requirements, cost and competitive pressures create requirements for lower cost, modular, standardized equipment, which can be installed, operated and maintained with minimal labor and human supervision.

Failures of the distribution feeder (faults) occur due to downed power lines, excavation of underground cable or other causes and are typically detectable by sensing excess (short circuit/overcurrent) current, and occasionally by detecting loss of voltage. In distribution systems, it is sometimes the case that a loss of voltage complaint by the customer is the means by which the utility senses the outage in order to respond by dispatching a crew to isolate the fault and reconfigure the distribution system.

To avoid operator intervention, fault protection devices that incorporate fault interrupter and circuit recloser capability can be strategically located within the power distribution system. The fault protection device operates upon detection of a fault to first isolate the fault to protect upstream, supply side equipment. Next, the fault protection device can implement a reclosing function that causes the fault interrupter to close one or more times after having been tripped open. If during any of these "reclosures", the fault becomes undetectable, service is restored and no extended outage occurs. Particularly on overhead distribution lines, temporary arcing due to wind, lightning, etc causes many faults. Thus, the majority of faults are cleared when the fault protection device opens and service is restored on the automatic reclose. Alternatively, after some number of reclosure attempts, if the overcurrent condition continues to be present, the recloser goes into a "lockout" state which prevents further attempts to clear the fault. At that point, repair technicians are dispatched to affect repair.

Service restoration, maintenance or repair may require bypassing fault protection devices. Bypassing is necessary to remove the fault protection device without disrupting service downstream of the fault protection device. The act of bypassing itself, however, can in certain circumstances appear as a fault and cause tripping of the fault protection device. Thus, the fault protection device should identify that the fault protection device is being bypassed and modify its operating parameters so as not to provide a false trip.

Typical procedures for bypassing a reclosing fault protection device include setting the device to a non-reclosing state and blocking ground trip. Block ground trip prevents inadvertent trip due to the unbalancing created by diverting current on one or two phases through the single-phase bypass switches. Non-reclosing is enabled because if a fault is caused by a crew doing the switching, it is likely to be a bolted or persistent fault, such as leaving a ground on the system. There is no reason to continue to try to close into such a fault. Moreover, technicians may be working near the device, and therefore near the fault, so non-reclosing is also desirable for that reason. Non-reclosing and ground trip blocking are both enabled for either operation—bypassing a reclosing fault protection device to take it out of service for maintenance or repair or removing bypassing to put a reclosing fault protection device back into service. To provide some capability to provide ground trip blocking, reclosing devices may include a manual capability for blocking ground trip. The operator modifies as setting, sets a switch, throws a handle, etc., to place the reclosing fault protection device in a ground trip blocking mode. Manual implementation of ground trip blocking requires, as expected, manual disabling of ground trip blocking.

DETAILED DESCRIPTION

A reclosing fault protection device includes a ground fault delay operating state. The reclosing fault protection device may incorporate a capability to recognize when it is in a partial bypass configuration (less than all phases being bypassed) and to also recognize this configuration is not a fault. Upon recognizing the partial bypass configuration, the reclosing fault protection device may enter a different operating state including modified fault protection operating parameters. For example, the reclosing fault protection device may implement a delay time-current-characteristic (TCC) associated with ground trip for the partial bypass state. Another state providing may be enabled when there is complete bypass, i.e., the fault protection devices of all three phases being bypassed, or no bypass. For example, the fault protection device may be set not to trip for a specified delay time once the bypass process has begun, assuming no faults occur during the bypass process, but should not delay if there is a high magnitude fault. In the complete bypass state, however, while the fault protection devices may operate or "trip" according to normal operating characteristics to isolate a fault, the action will be ineffectual in view of the bypass state of the fault protection device.

Preferably, the reclosing fault protection device changes from a first, complete bypass/no bypass operating state to the second, ground trip delay or partial bypass state automatically. In this regard, it recognizes by analysis of various operating parameters a partial bypass configuration and that this configuration is different than a fault. Responsive to the partial bypass indication, it enters a ground trip delay operating mode.

Figure 1:
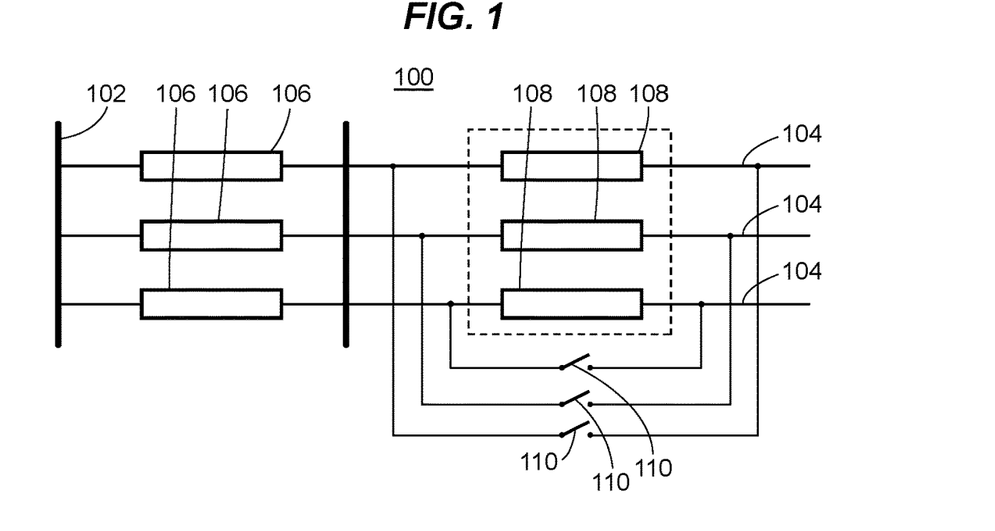
FIG. 1 is schematic diagram illustrating a portion of an electrical power distribution system incorporating fault protection devices and bypass switches.

FIG. 1 shows a simplified view of a portion of an exemplary electrical power distribution system 100 that includes reclosing fault protection devices 108 paralleled by bypass switches 110, wherein the devices 108 may be configured to incorporate ground trip delay and/or ground trip blocking. The distribution system 100 may include a plurality of sources of electrical power, one shown as source 102, connected to a plurality of users or loads (e.g., factories, homes, etc. (not depicted)) through electrical distribution lines 104 such as conventional electrical power lines.

The power source 102 may be protected by one or more boundary protection devices, such as circuit breakers 106 or other suitable devices. The devices 108 may placed at predetermined points along the line 104 segmenting the line and providing an ability to isolate a load and potential fault from supply side loads and sources. The depiction of the number of sources 102, users, lines 104 and devices 108 in FIG. 1 is arbitrary and there may be many different configurations and virtually any number of each of these components in any given distribution system.

Figure 2:
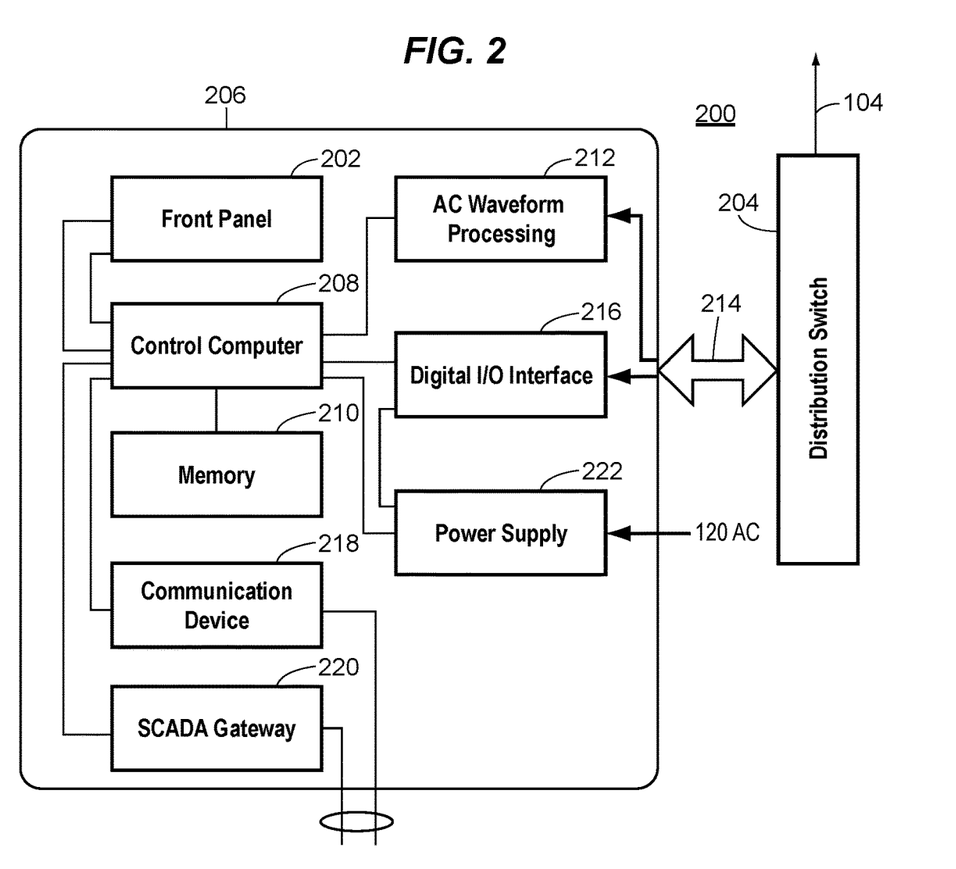
FIG. 2 is a block diagram of a fault protection device.

FIG. 2 illustrates an embodiment of a reclosing fault protection device 200, that is suitable for use as the devices 108 in the system 100. A distribution line, such as line 104, passes through a fault isolation operator 204, e.g., a switch, a vacuum interrupter or similar device, which can open and close the distribution line 104 to isolate a fault in the line 104 from the source 102. In other embodiments, the fault isolation operator 204 may be any suitable device or devices capable of performing power sensing, control or conditioning functions such as voltage regulation (voltage regulators), reactive power control (switched capacitor banks), fault sensing, etc. in conjunction with fault isolation. It will be appreciated that the device 200 may also be of a type for controlling two (dual), three, or more switches, with customer loads or alternate sources between the switches. In this case, the distribution line or lines 104 would pass through two or more switches 204 that can open and close independently under the control of the single device 200.

A controller 206 controls the operator 204. The controller 206 includes a control computer or suitable processing device 208, a display 202, and an associated memory 210. The memory 210 may store, among other data, the programming to control the device 200, programming to determine configuration and performance data, the configuration data for the device, and a database of device records relating to other devices in the system.

Those skilled in the art will recognize that the operator 204 can have different operating capabilities and may be programmed to provide a number of different system coordination and fault protection functions. When programmed as a protective device, the operator 204 is controlled in accordance with operating parameters such as fault protection parameters. For example, the operator 204, if normally closed, may be opened under overcurrent conditions (fault current) to prevent fire or damage to the circuit or to customer equipment, and also for safety concerns.

The control computer 208 is connected to an AC waveform processor 212. The AC waveform processor 212 is connected through a field interface connector 214 to the distribution line 104. This allows the processor to measure various parameters of the electricity on the distribution line 104 such as, voltage and current, digitally convert them, and send them to the control computer for processing, communications, or storage in memory.

The digital I/O interface 216 is connected to the control computer 208, the operatore 204 and the distribution line 104. The digital I/O interface 216 allows the controller 206 to receive switch position sensing information and other inputs, and to output control outputs to the switch.

The communications device 218 is connected to the control computer 208 and allows it to communicate with other devices on the system through suitable communications channels. The communications device 218 can be connected to any communications network that is conveniently available and has the desired characteristics. For example, a Metricom Radio network may be used. An optional communications device 220 may be included in the device 200. An example of such a secondary communication option may be a SCADA gateway. Power is supplied to the device 200 through a power supply/battery backup 222. The battery can be charged from solar power, an AC potential transformer, or from power supplied through the voltage sensors.

The fault operating parameters of the devices 200 may be set so that operation of each individual device 200 in accordance with the fault operating parameters coordinates with the other devices and boundary devices such as breakers that protect the distribution feeder(s) and fuses that protect load(s) that are tapped off of the feeder. That is, the fault operating characteristic of each of the devices 200 is based upon one or more fault protection parameters set within the device. The fault protection parameters may be selected in relationship to the other devices in the system, and particularly devices that do not have adjustable or settable fault protection characteristics, so that operation of the fault protection device coordinates with operation of the other devices to better facilitate fault isolation and service restoration. For example, the fault protection operating characteristics of the device 200 may include a time-current-characteristic (TCC) operating curve that is established at least in view of TCC curves associated with boundary devices within the system and potentially other fault protection devices within the systems. Moreover, each device 200 may have one or more operating modes or states. A different TCC curve may be associated with each operating mode or state, and the device may automatically switch between operating modes. The devices 200 may thus have a first or normal operating mode and a second, ground trip delay operating mode.

In order to be able to change from the first, normal operating mode to the second, ground trip delay operating mode, the reclosing fault protection device must quickly recognize conditions, such as being in a partial bypass configuration, that requires the ground trip delay operating mode and also recognize this mode as being different from a fault condition. This can be accomplished by analysis of one or more parameters of the current being seen by the device 200 to obtain an indication of the existence of a partial bypass configuration or a fault. In one preferred embodiment, monitoring the value of ground current may provide such an indication. Closing one or two of the bypass switches 110 paralleling the device 108 will immediately cause the current to divide between two parallel paths based on impedance: through the device 108 and through the bypass switch 110. This causes an increase in ground current which can be measured by the device 108 due to phase unbalance. Alternatively, zero-sequence current may be measured as a surrogate for ground current. At the same time, the closing of a single bypass switch 110 in parallel with the device 108 should not have any effect on the other two phase currents. Also, closing a single bypass switch 110 does not cause a change in voltage measured by the reclosing fault protection device 108. For example, current measured by the device 108 may drop by approximately 30% when the bypass switch 110 is closed.

In one preferred embodiment, the controller 208 of the device 200 may implement an algorithm that looks for several conditions before asserting ground trip delay. These conditions may include:

1. ground trip element picks up;
2. one phase current step change greater than a threshold;
3. simultaneous change in other phase current less than a threshold;
4. simultaneous voltage change in all phases less than a threshold; and
5. ground current above ground minimum trip and below phase minimum trip after step change.

As noted, one phase current step change of as much as 30% may be seen, and the device 200 may look for a step change in excess of 20%, for example. Changes in the other currents should be relatively minor, and for example, less than 2%. Likewise, voltages changes should be minimum, and for example, less than 1%. These numbers of course are exemplary, and may be and should be chosen for the particular application. Moreover, it may not be necessary to consider all of these parameters, and a subset of the parameters may be employed. Additional parameters effective to provide an indication of partial bypass configuration may also be used. For example, items 2 and 3 are not necessary but can be included to improve partial bypass configuration detection confidence. There may be other conditions used to help discriminate between normal conditions, partial bypass, and fault conditions, such as monitoring the ground X/R values.

Figure 3:
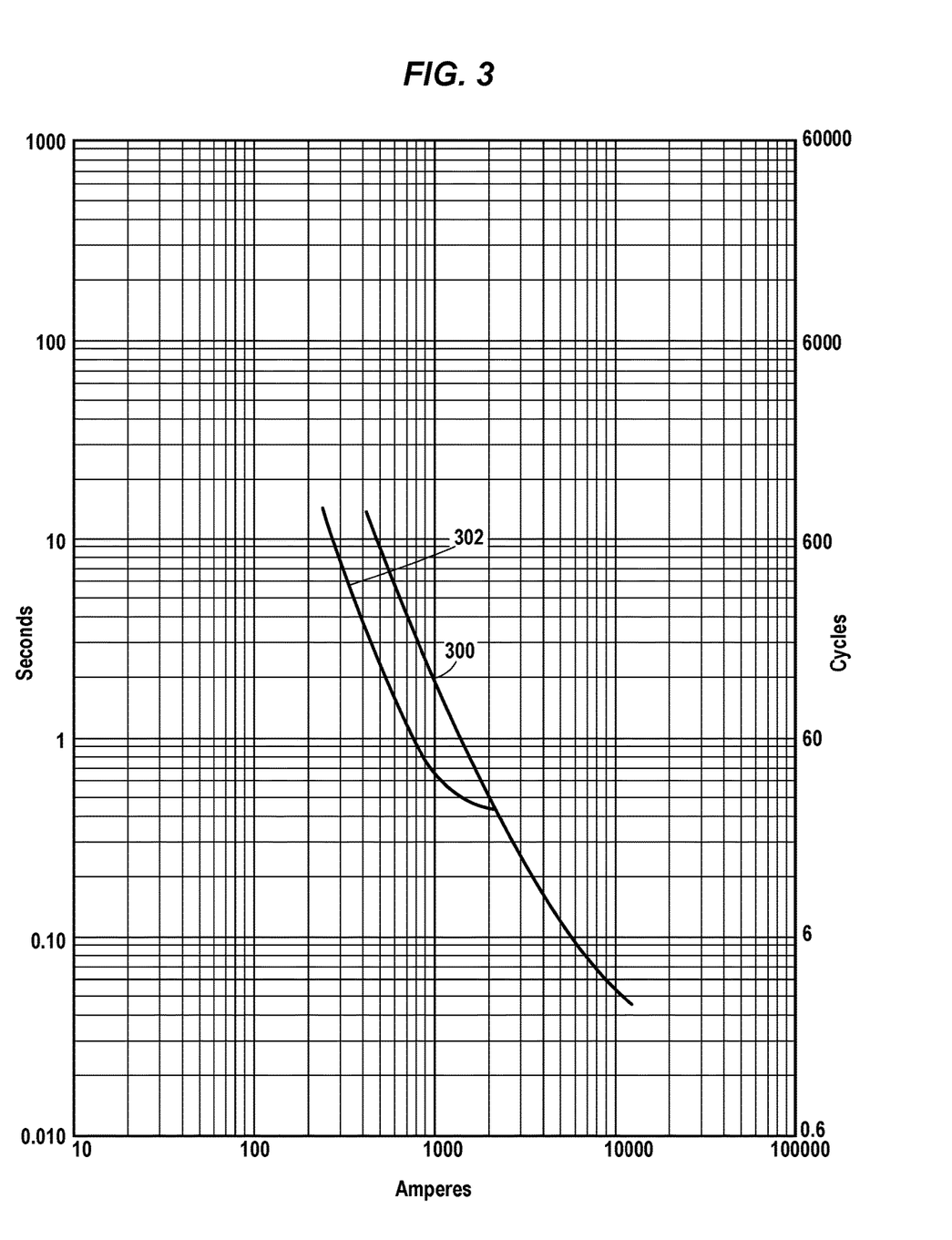
FIG. 3 is a plot illustrating a first time-current-characteristic for fault protection devices of the electrical power distribution system.
Figure 4:
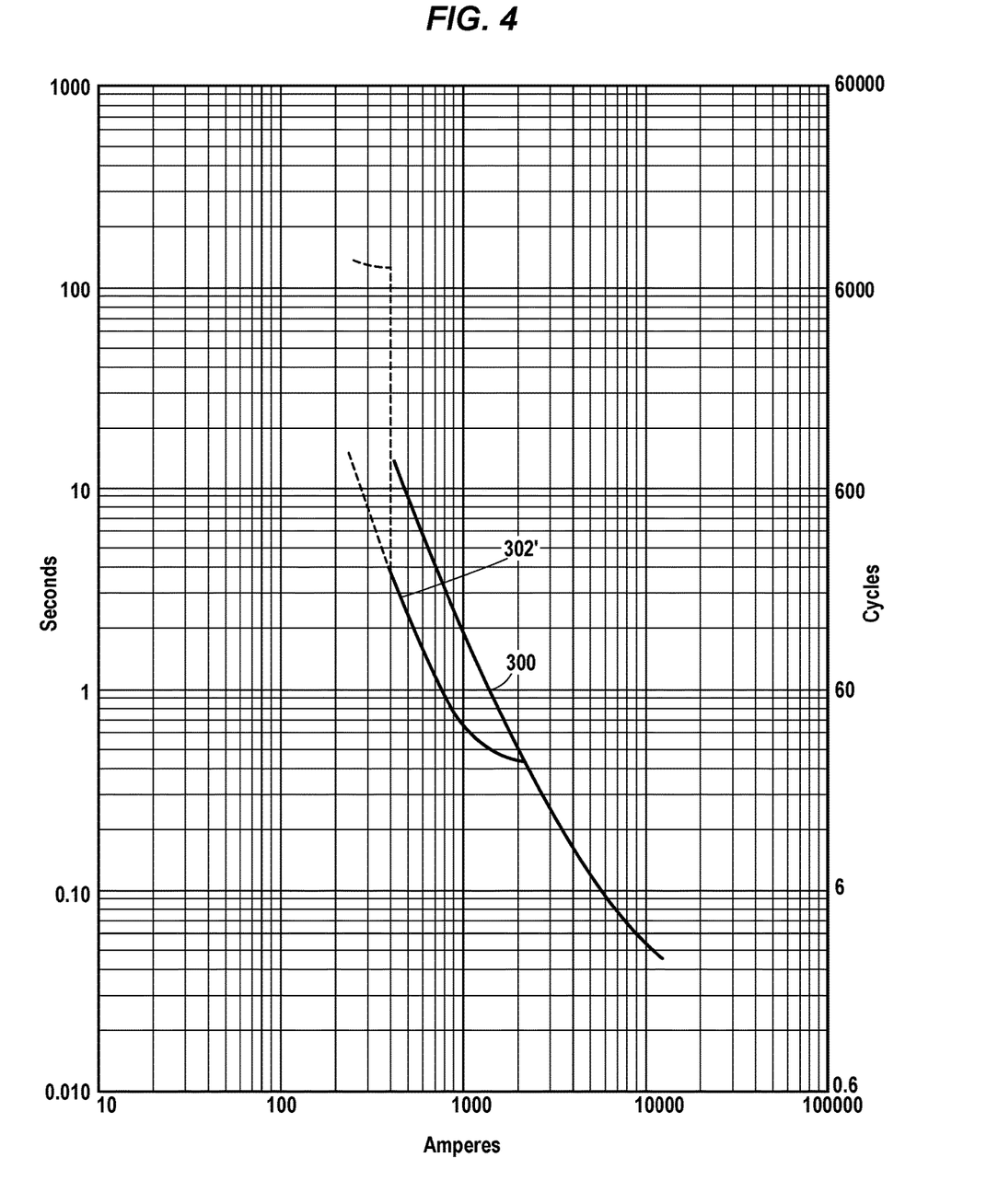
FIG. 4 is a plot illustrating a second time-current-characteristic for fault protection devices of the electrical power distribution system incorporating ground trip delay.

When the parameters, e.g., voltage and current signatures, indicate a partial bypass configuration, ground trip delay is asserted and the device 200 modifies its operating parameters to provide ground trip delay. Upon assertion of ground trip delay, the segment of the ground curve between the minimum ground trip and minimum phase trip is delayed by a user-selectable time. For example, the user may be able to select a delay time of zero to ten minutes. A time of zero essentially disables the ground trip delay feature—this would be useful if there is a ganged three-phase bypass switch. A preferred default setting is a two minute delay. FIG. 3 shows the normal protection minimum phase trip curve 300 and the minimum ground trip curve 302. FIG. 4 shows the ground trip delay modified ground trip curve 302', delayed the exemplary two minutes. An alternative implementation is to delay the entire ground curve by the specified time. Overcurrent protection may be made the same whether the whole curve or partial curve is delayed because the ground trip delay may be immediately set to zero if the ground current exceeds the phase minimum pickup.

An alternate criteria for asserting ground trip delay may include:

1. the appropriate fault interrupting device (ground or negative sequence) is timing;
2. All three the phase currents are below the low-current cutoff for the phase elements (or below, for example, 720 A, if no phase element is instantiated). If directional TCC's are used for the fault interrupting devices, the larger of the low-current cutoff for the two directions is used; and
3. The appropriate sequence voltage (zero or negative for the delay operating mode & normal operating mode, respectively) has not changed by more than 5% of the positive-sequence voltage. The basis for the change is the voltage before the ground or negative-sequence element starts timing.

If ground trip delay is invoked, it may be abandoned upon failure of either of criteria (2) or (3). The delay process does not influence the TCC's of ground or negative sequence elements; i.e., the TCC's are allowed to time normally during the delay process and tripping requires both the element reaching its trip state and the fulfillment of the delay, if applicable.

After ground trip delay has been asserted, the device 200 may resume normal ground protection upon satisfaction of various conditions. For example, once all three bypass switches 110 have been opened or closed, the phase currents may be approximately balanced again; however because current sharing is not controlled phase balance may be inferred from contact resistance and stray inductance of the current paths. In essence, when all the bypass switches are open or closed, then the current is expected to be below the user-selected minimum trip for ground currents during non-fault conditions, i.e., "normal" operation. The device 200 should recognize that the switching operations are completed, since the ground current will fall below the ground minimum pickup value, and immediately resume ground protection. A timeout feature may also be used. Most bypassing will be completed in approximately 30 seconds but may take two minutes or longer. Using a two minute timer, as an example, once the first switch 110 is thrown the line crew has two minutes (or whatever time is selected) to complete the switching procedure on the other two phases before the device 200 resumes ground protection. Thus, the normal operating state may be re-enabled upon satisfaction of:

1. bypass procedure being completed;
2. removal of the partial bypass configuration (however, the timer may be reset if the bypass procedure is restarted);
3. expiration of the ground trip delay timer.

However, with the fault interrupter being bypassed, it cannot provide fault protection even if it detects a fault and trips in the normal operating state. The return to the normal operating state following bypass merely indicates that the fault protection device is no longer operating in the delay state.

Figure 5:
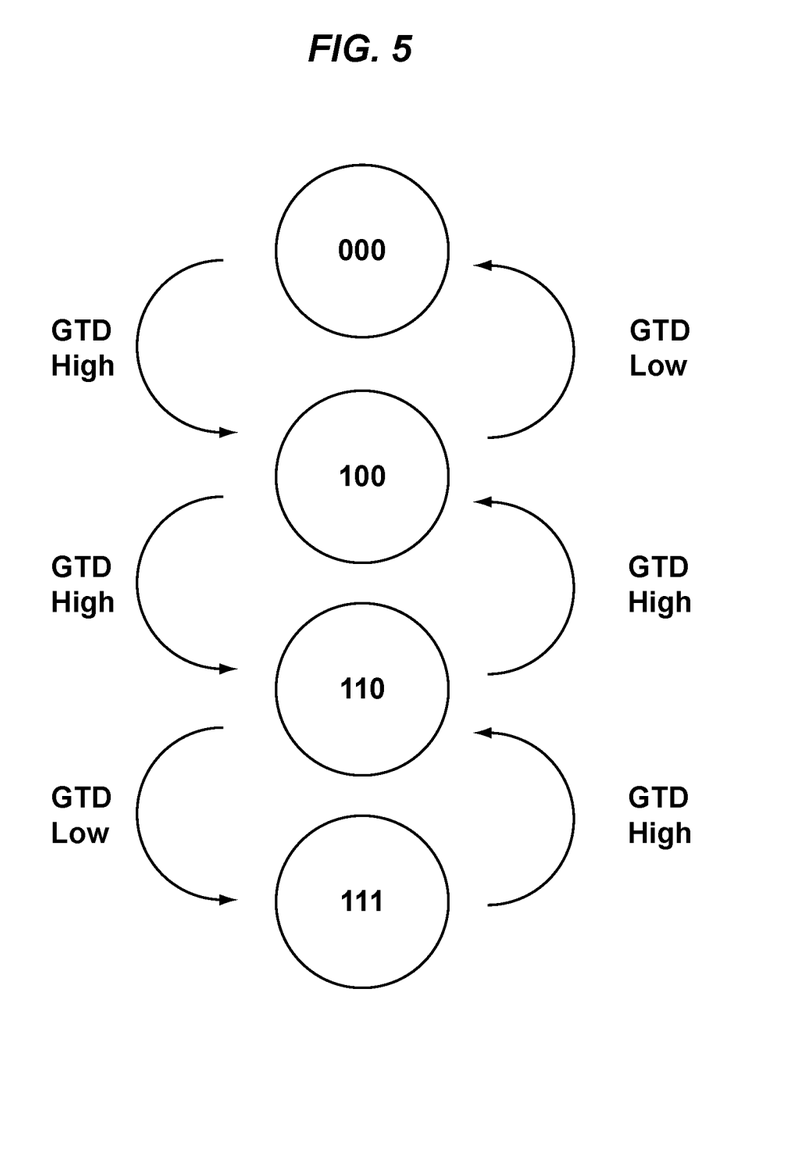
FIG. 5 is a state diagram associated with establishing one or more operating states of the fault protection devices of the electrical power distribution system including a ground trip delay state.

The bypass switches 110 for each phase, e.g., three phases, are typically operated in succession, with a short delay when moving from one switch 110 to the next. After closing a switch 110, the lineman will often step to the side to make a visual check that the switch 110 is securely closed. If the switch 110 did not appear to close to his satisfaction, he will reopen the switch 110 and then close it again. It is important that the device 200 does not get confused during this sequence. The various states and associated assertion of ground trip delay are illustrated in FIG. 5, where:

000=all bypass switches are open;
100=any one bypass switch is closed;
110=any two bypass switches are closed; and
111=all three bypass switches are closed.

The 100 and the 110 states are partial bypass configuration states such that ground trip delay is asserted: GTD High. The 000 and 111 states are either complete bypass or no bypass such that ground trip delay is not asserted: GTD Low.

As described in connection with the various embodiments and depicted in FIG. 5, the device 200 adds a ground trip time delay for each partial bypass state—when any one or two bypass switches are closed. Full ground trip protection is enabled when all three bypass switches are in the same position—all open or all closed; however, as noted above, in the full bypass state while the fault protection devices may operate responsive to a fault, they cannot isolate the fault because of the bypass. Also, ground protection is returned to normal after the ground trip delay time delay expires. If the algorithm incorrectly assumes a bypass condition when it is really a fault condition, ground overcurrent tripping of the device 200 will be delayed by delay time, e.g., 0 to 10 minutes. Thus, ground trip delay should not be asserted unless the residual current exceeds the ground minimum trip value. This reduces the risk of not tripping for a fault due to an erroneous block.

In an alternative implementation, upon satisfaction of parameters indicative of a partial bypass configuration, ground trip delay is asserted with the user selected delay time. Ground current trip occurs upon any of the following:
1. ground trip element picks up;
2. ground trip time is reached (sum of TCC trip time and ground trip delay time).

In addition, the ground trip delay may be set to zero, e.g., ground trip delay disabled:
1. anytime the ground current exceeds the phase element minimum pickup current, or
2. there is a change in residual voltage that is greater than a predetermined percentage at the time of ground element pickup.

Also, if timing, the trip timer and ground trip delay are immediately reset to zero if the ground current falls below the ground current element minimum pickup.

Alternatively, and perhaps preferably, for criteria (2), above, the TCC may time out in parallel with the ground trip delay to give a more predictable overall response.

The following simulation data provides several examples of current conditions and corresponding ground trip delay assertion states:

Basic Examples of Device Currents During Bypassing Procedures

| | \multicolumn{7}{c}{Bypassing} | | | | | | | |
|---|---|---|---|---|---|---|---|---|
| | \multicolumn{7}{c}{Ideal conditions (balanced load in mag & ang, 40% device current in bypass mode)} | | | | | | | |
| | 1 ph Bypass Switches | | | Currents Measured by Reclosre | | | Desired | |
| | A | B | C | A | B | C | G | GTD State |
| Initial State | Open | Open | Open | 400 | 400 | 400 | 0 | Off |
| Step 1 | Close | Open | Open | 160 | 400 | 400 | 240 | ON* |
| Step 2 | Close | Close | Open | 160 | 160 | 400 | 240 | ON* |
| Step 3 | Close | Close | Close | 160 | 160 | 160 | 0 | Off |
| | 1 ph Bypass Switches | | | Currents Measured by Recloser | | | Desired | |
| | A | B | C | A | B | C | G | GTD |
| \multicolumn{9}{c}{Unbalance load and angle, device current in bypass = 30% on A, 35% on B, 40% on C} | | | | | | | | |
| Initial State | Open | Open | Open | 200 | 250 | 300 | 90 | Off |
| Step 1 | Close | Open | Open | 60 | 250 | 300 | 219 | ON* |
| Step 2 | Close | Close | Open | 60 | 88 | 300 | 228 | ON* |
| Step 3 | Close | Close | Close | 60 | 88 | 120 | 52 | Off |
| \multicolumn{9}{c}{Removing Bypass} | | | | | | | | |
| \multicolumn{9}{c}{Ideal conditions (balanced load in mag & ang, 40% device current in bypass mode)} | | | | | | | | |
| Initial State | Close | Close | Close | 160 | 160 | 160 | 0 | Off |
| Step 1 | Open | Close | Close | 400 | 160 | 160 | 240 | ON* |
| Step 2 | Open | Open | Close | 400 | 400 | 160 | 240 | ON* |
| Step 3 | Open | Open | Open | 400 | 400 | 400 | 0 | Off |
| \multicolumn{9}{c}{Unbalance load and angle, device current in bypass = 30% on A, 35% on B, 40% on C} | | | | | | | | |
| Initial State | Close | Close | Close | 60 | 88 | 120 | 52 | Off |
| Step 1 | Open | Close | Close | 200 | 88 | 240 | 100 | ON* |
| Step 2 | Open | Open | Close | 200 | 250 | 120 | 114 | ON* |
| Step 3 | Open | Open | Open | 200 | 250 | 300 | 87 | Off |

*Automatic GTD only asserted if residual current exceeds ground min trip.

One of skill in the art will appreciate fault protection devices may invoke a delay operating state responsive to numerous combinations of, modifications of or additions to the herein described criteria. Furthermore, there may be various combinations of, modifications of or additions to the delay state operating parameters. The herein described embodiments or modifications thereof may introduce what may be perceived as atypical operating characteristics. For example, tripping of the fault protection device may be delayed if there is a low-magnitude fault (that is a fault that does not cause a voltage imbalance). Also, because the fault interrupting device cannot interrupt current in the poles that have been bypassed, if a fault occurs once the bypass process has begun, tripping of the fault protection device is acceptable, but is not required as it will be ineffectual. And, because current sharing between the fault protection device and the bypass path is not controlled, the fault protection may trip once it is fully bypassed and the delay time is satisfied, which is also acceptable.

While the invention is described in terms of several preferred embodiments of reclosing fault protection devices, it will be appreciated that the invention is not limited to such devices. The inventive concepts may be employed in connection with any number of devices including circuit breakers, reclosers, and the like.

While the present disclosure is susceptible to various modifications and alternative forms, certain embodiments are shown by way of example in the drawings and the herein described embodiments. It will be understood, however, that this disclosure is not intended to limit the invention to the particular forms described, but to the contrary, the invention is intended to cover all modifications, alternatives, and equivalents defined by the appended claims.

It should also be understood that, unless a term is expressly defined in this patent using the sentence "As used herein, the term ' ' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Unless a claim element is defined by reciting the word "means" and a function without the recital of any structure, it is not intended that the scope of any claim element be interpreted based on the application of 35 U.S.C. § 112, sixth paragraph.

We claim:

1. A fault protection device adapted to couple between a supply side and load side of a three-phase power distribution system to isolate load side faults from the supply side, the fault protection device comprising:
    a fault interrupter having a three-phase first terminal to couple a first phase, a second phase and a third phase of the supply side to the fault interrupter and a three-phase second terminal to couple the first phase, the second phase and the third phase of the load side to the fault interrupter, the fault interrupter having a first operating state and a second operating state, the first operating state defining a first fault response associated with a non-bypassed or total bypassed state of the fault interrupter and the second operating state defining a second fault response responsive to a partial bypass state of the fault interrupter, wherein in the partial bypass state at least one but fewer than all of the three phases are bypassed around the fault interrupter;
    the first operating state and the second operating state being automatically selected by the fault protection device upon detecting a parameter indicative of the partial bypass state.

2. The fault protection device of claim 1, comprising:
    an algorithm associated with the fault protection device, the algorithm coupled to receive the parameter and to provide an output to the fault protection device, the fault protection device being responsive to the output to select one of the first operating state and the second operating state.

3. The fault protection device of claim 1, wherein the parameter is indicative of a number of bypass switches fewer than all of the three phases of the power distribution system being closed in parallel with the fault protection device.

4. The fault protection device of claim 1, wherein the parameter is indicative of the partial bypass state.

5. The fault protection device of claim 1, wherein the parameter is indicative of the total bypassed state.

6. The fault protection device of claim 1, the second operating state comprising a ground trip delay response.

7. The fault protection device of claim 1, wherein the parameter comprises at least one of a ground trip factor, a voltage factor and a ground current factor.

8. The fault protection device of claim 1, wherein the second operating state is transient.

9. The fault protection device of claim 1, wherein the first operating state is restored upon existence of a fault condition.

10. A method of providing a ground trip delay state in a fault protection device comprising:
    determining at least one but fewer than three phases of a power distribution system are bypassed around the fault protection device constituting a partial bypass condition of the fault protection device; and
    delaying ground trip operation of the fault protection device.

11. The method of claim 10, wherein determining the partial bypass condition comprises determining a one phase current step change greater than a threshold.

12. The method of claim 10, wherein determining the partial bypass condition comprises determining a one phase current step change greater than a threshold and simultaneous change in other phase currents less than a threshold.

13. The method of claim 10, wherein determining the partial bypass condition comprises determining a one phase current step change greater than a threshold and simultaneous voltage change in all phases less than a threshold.

14. The method of claim 10, wherein determining the partial bypass condition comprises determining a one phase current step change greater than a threshold and a ground current above a ground minimum trip and below a phase minimum trip after determining the step change.

15. The method of claim 10, wherein determining the partial bypass condition comprises determining a one phase current step change greater than a threshold; a simultaneous change in other phase current less than a threshold; a simultaneous voltage change in all phases less than a threshold; and ground current above a ground minimum trip and below a phase minimum trip after step change.

16. The method of claim 10, wherein determining the partial bypass condition comprises determining a ground trip pickup.

* * * * *